(12) United States Patent
Riley (10) Patent No.: US 12,175,235 B2
(45) Date of Patent: Dec. 24, 2024

(54) SMART SOFTWARE UPDATE SYSTEM

(71) Applicant: PC Matic Inc, Sioux City, IA (US)

(72) Inventor: Matthew Quincy Riley, Owosso, MI (US)

(73) Assignee: PC MATIC, INC., Sioux City, IA (US)

( * ) Notice: Subject to any disclaimer, the term of this patent is extended or adjusted under 35 U.S.C. 154(b) by 61 days.

(21) Appl. No.: 18/147,040

(22) Filed: Dec. 28, 2022

(65) Prior Publication Data

US 2024/0220230 A1    Jul. 4, 2024

(51) Int. Cl.
*G06F 8/65*    (2018.01)
*G06F 9/48*    (2006.01)

(52) U.S. Cl.
CPC .............. *G06F 8/65* (2013.01); *G06F 9/4881* (2013.01)

(58) Field of Classification Search
CPC ................................ G06F 8/65; G06F 9/4881
USPC .................................................. 717/168–175
See application file for complete search history.

(56) References Cited

U.S. PATENT DOCUMENTS

| | | | | |
|---|---|---|---|---|
| 6,606,744 B1* | 8/2003 | Mikurak | .................... | H04L 9/40 717/174 |
| 6,681,391 B1* | 1/2004 | Marino | ..................... | G06F 8/61 711/134 |
| 7,185,332 B1* | 2/2007 | Waldin | ..................... | G06F 8/658 717/170 |
| 7,694,293 B2* | 4/2010 | Rao | .......................... | H04L 67/34 717/172 |
| 8,321,858 B1* | 11/2012 | Marmaros | ................. | G06F 8/65 717/173 |
| 8,762,980 B1* | 6/2014 | Sobel | ........................ | G06F 8/65 717/172 |
| 8,914,791 B1* | 12/2014 | Salzano | .................... | G06F 8/65 717/173 |
| 9,313,211 B1 | 4/2016 | Lototskiy | | |
| 9,661,491 B1* | 5/2017 | Abramson | ............... | G06F 8/38 |
| 9,672,023 B2* | 6/2017 | Matthew | ................... | G06F 8/60 |
| 9,727,326 B2* | 8/2017 | Ciudad | ..................... | G06F 8/65 |
| 9,785,428 B2* | 10/2017 | Liang | ...................... | H04L 67/10 |
| 10,922,073 B2* | 2/2021 | Norris | ..................... | G06F 9/505 |
| 11,204,756 B1* | 12/2021 | Samuel | ..................... | G06F 8/65 |
| 11,277,465 B2* | 3/2022 | Chmielewski | ......... | G05B 15/02 |
| 11,762,649 B2* | 9/2023 | Liao | .......................... | G06F 8/65 717/168 |
| 2007/0150815 A1 | 6/2007 | Smith et al. | | |

(Continued)

OTHER PUBLICATIONS

Mugarza et al, "Dynamic Software Updates to Enhance Security and Privacy in High Availability Energy Management Applications in Smart Cities", IEEE, pp. 42269-42279 (Year: 2019).*

(Continued)

*Primary Examiner* — Anil Khatri
(74) *Attorney, Agent, or Firm* — D2 Worldwide LLC; Frank Liebenow (57) ABSTRACT

A system for smart updates includes smart update software that predicts an update window by monitoring activity at the device so that the update is performed when there is little or no activity, indicating that a user/users of the device are not relying on the device to perform work and/or there is little or no active remote access to the device. Such activity is determined by inputs from human input devices, network traffic, storage system I/O, audio inputs, camera inputs, etc.

17 Claims, 6 Drawing Sheets

(56) References Cited

U.S. PATENT DOCUMENTS

2018/0081776 A1* 3/2018 Brown .................. G06F 11/261
2018/0189046 A1* 7/2018 Kunisetty ................ G06F 8/65

OTHER PUBLICATIONS

Tzeremes et al, "A Software Product Line Approach for End User Development of Smart Spaces", IEEE, pp. 23-26 (Year: 2015).*
Vaniea et al, "Tales of Software Updates: The process of updating software", ACM, pp. 3215-3226 (Year: 2016).*
Kim et al, "Remote Software Update in Trusted Connection of Long Range IoT Networking Integrated With Mobile Edge Cloud", IEEE, pp. 66831-66840 (Year: 2018).*
Vartiainen, et al, "Auto-update: A Concept for Automatic Downloading of Web Content to a Mobile Device", ACM, 683-689 (Year: 2007).*
Hong et al, Thumbup: Dynamic Update of IoT Device Application for Smart Personalized Services, IEEE, pp. 570-575 (Year: 2016).*

\* cited by examiner

SMART SOFTWARE UPDATE SYSTEM

FIELD OF THE INVENTION

This invention relates to the field of computer security and more particularly to a system for making smart decisions as to when to update certain software packages based upon usage activities.

BACKGROUND OF THE INVENTION

For many types of devices such as personal computers, smartphones, tablet computers, servers, software is periodically updated to add features, fix problems, enhance performance, or to reduce vulnerability to intrusion by malware. For some software, in particular operating system software, the updated software is downloaded and stored in a temporary folder, then at some point in time, the update is performed, locking out the user, and often rebooting the device. As such an update often requires several minutes of downtime, there are often warnings to the user as well as some limited ability to defer the update until a convenient time for the user, though there is often an attempt to not allow the user to defer the update for too long being that the security of the device might be at risk by running old versions of the software.

Another type of up update often does not require rebooting the device, for example, when application-level software is updated. When an application such as a browser, word processor, or anti-virus software needs to be updated, as above, the updates are downloaded and stored in a temporary folder and, usually, the next time the application is restarted, the updates are applied before the application start running. Even though this process works well, as some often start a browser and keep it running indefinitely, it often takes many days or weeks before the browser is restarted, missing out on the updates for all that time.

The application update process works well for applications such as word processors, email programs, and browsers but not for programs that are not typically restarted such as communications programs, anti-virus programs, cloud storage drivers, virtual private network drivers, and the like. This class of applications are started when the device boots and continue to run until the device is shut down or rebooted. Therefore, a mechanism is needed to update such applications, for example, if it is determined that a cloud storage driver has a feature that allows malware to access private data files, it is important that this cloud storage driver be updated immediately. To perform such an update, after the update is downloaded, the process of the cloud storage driver must be terminated, then the update is performed, then the cloud storage driver is restarted.

One major problem with the application update process is that when the update is made, there is a chance that the application is in use. For example, if a user is working on data files that are stored in the cloud while the update is performed, the user will be blocked from those files during the update and may experience a loss of some changes that were being made when the update started. An even more dangerous scenario occurs when a security-related application is updated, for example, an anti-malware program or communications program used by an anti-malware program. The period between when the process of such a program is terminated and until the updated process begins to run provides a window in which the device is not protected from malware. For example, if the anti-malware process is terminated and before the anti-malware process restarts, the user of the device opens an email attachment containing malware, it will be possible that the malware will be introduced to the device before the anti-malware process restarts.

What is needed is a system that will defer certain updates until a time when user activity is less likely.

SUMMARY OF THE INVENTION

Elements of the disclosed invention include smart update software that predicts an update window by monitoring activity at the device so that the update is performed when there is little or no activity, indicating that a user/users of the device are not relying on the device to perform work and/or there is little or no active remote access to the device. Such activity is determined by inputs from human input devices, network traffic, storage system I/O, audio inputs, camera inputs, etc.

In one embodiment, a system for smart software updates is disclosed. The system includes a device that has a processor, storage, an application located in the storage and running on the processor, and an operating system software running on the processor. Smart update software also runs on the processor. After receiving a request to update the application, the smart update software downloads update information for the application and stores the update information in the storage. Next, the smart update software determines an update window by monitoring inputs/outputs of the device for absence of activity for a period of time and after the smart update software determines the update window, the smart update software installs the update information for the application.

In another embodiment, a method for updating an application that is installed on a device is disclosed. The device has a processor, storage, and an operating system software running on the processor. The method includes receiving a request to update the application and responsive to such, downloading update information for the application and storing the update information in the storage. Next, determining an update window by monitoring parameters of the device for absence of activity over a period of time and after finding the update window, installing the update information for the application.

In another embodiment, a system for smart software updates is disclosed. The system includes a device that has a processor, storage, an application located in the storage and running on the processor, at least one human input device, and an operating system software running on the processor. Smart update software runs on the processor and after receiving a request to update the application, the smart update software downloads update information for the application and stores the update information in the storage. Next, the smart update software waits until there is an absence of inputs from the at least one human input devices for a pre-determined period of time and after the smart update software finds an absence of inputs from the at least one human input devices for the pre-determined period of time, the smart update software installs the update information for the application.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION OF THE INVENTION

Reference will now be made in detail to the presently preferred embodiments of the invention, examples of which are illustrated in the accompanying drawings. Throughout the following detailed description, the same reference numerals refer to the same elements in all figures.

In general, the smart software update system plans when an update will be made by monitoring operating system parameters to determine a good point in time to perform the update, called an update window. The operating system parameters are any parameter that indicates or infers activity on the device and, therefore, the smart software update system monitors such parameters to determine an update window in which the software update will be performed. For example, by monitoring input devices such as human input devices (e.g., keyboards, mice, touch screens, other pointing devices), audio input, etc., after the smart software update system determines that no input has occurred for a predetermined period of time, the smart software update system assumes the device is idle and there is an update window in which the scheduled update is performed.

As some devices are accessed remotely (e.g., through a virtual private network), in some such embodiment, other parameters are monitored to determine activity such as disk activity and network activity. For example, a network activity of greater than 1% indicates a remote device is accessing the device and, therefore, the device is active. Of course, some devices will constantly experience some level of disk activity and network activity and using preset thresholds for judging such activity as being idle may result in a situation in which device activity is always detected and, therefore, updates are never performed. In such cases, the smart software update system utilizes internal intelligence either through heuristics or artificial intelligence to adjust the thresholds to find a setting that will permit an update window during the lowest predicted utilization.

Another way to determine an update window is by certain contextual situations. For example, if an anti-malware program is scheduled to be updated and the anti-malware program protects against viruses that enter the system from a network (e.g., the Internet), if it is determined that there is no connection to the network or, if there is a connection to the network, but there are no programs running that might introduce a virus emanating from the network (e.g., browser programs and email programs), then even though there is user activity, an update window is declared since there is low risk of a virus being introduced. In other words, the target of the update (in this case, the anti-malware program) needs to be updated and the target of the update deals with a specific resource (e.g., monitors network traffic to guard against intrusion by malware), the update window is determined when that specific resource is not being used—e.g., no programs such as browsers and email programs are actively connected to the network. In this example, it is anticipated that non-user programs are connected to the network as, in this context, there is a very low risk that operating system programs will introduce malware into the user device.

Throughout this description, the term, "device" refers to any device that has a processor, runs software, and on which, the smart software update system manages application updates. One example of such is a personal computer. Another example is a smartphone or tablet. The term, "user" refers to a human that has an interest in the target device, perhaps a user who is using the target device.

Figure 1:
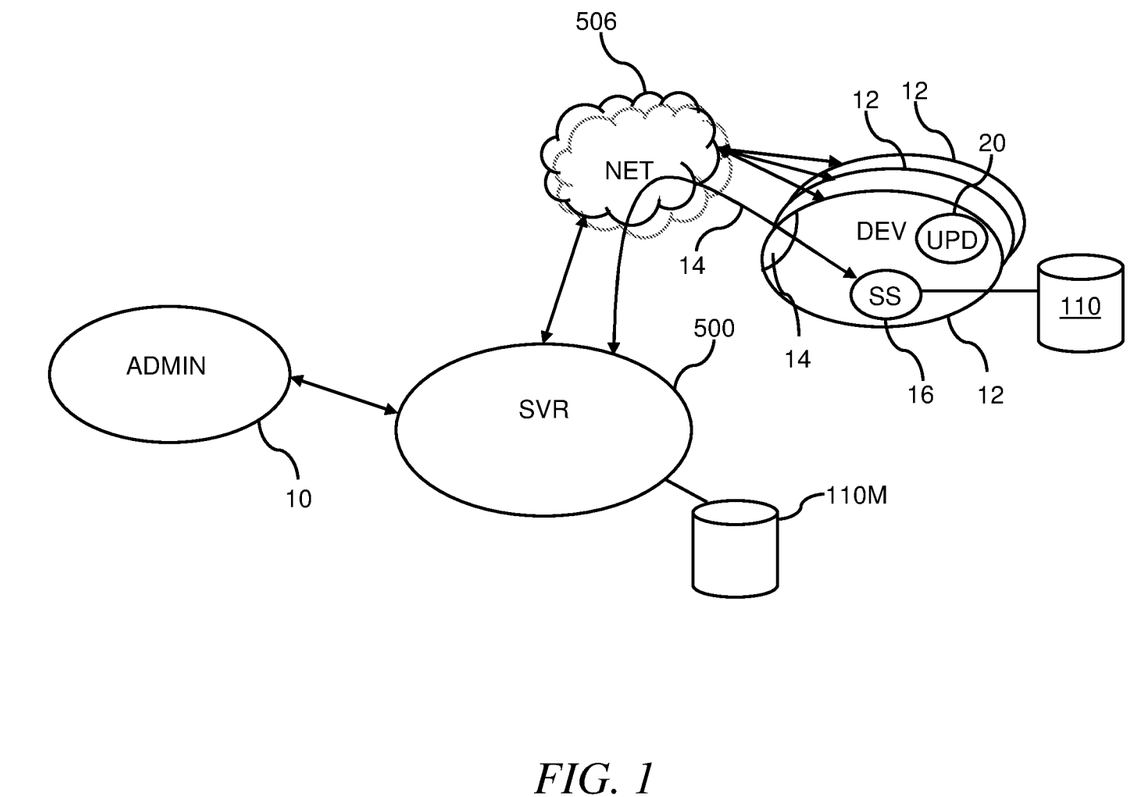
FIG. 1 illustrates a data connection diagram of the smart software update system on a protected device.

Referring to FIG. 1 illustrates a data connection diagram of the smart software update system. In this example, there are two key applications running on the devices 12 (note, any number of devices 12) for protecting each device 12 from malware. As an example, the security software 16 utilizes a data file 110 (e.g., a whitelist) to determine what programs are allowed to initialize on the device 12 and there is a communications controller 14 for maintaining a connection to a server 500. The server 500 monitors/manages the security software 14, for example, when entries are added to the master data file 110M, perhaps by an administrator 10, the master data file 110M is relayed to the security software 14 by the communications controller 14 running on each device 12.

The smart software update system includes an update program 20 that, when an update is required, monitors activities on the device 12 to determine a possible update window and when there is an update window, terminates the running process, updates the program, and restarts the program. For example, if an update to the security software 14 is needed, the updated security software is downloaded by the update program 20 and stored in temporary storage. Then, the update program 20 looks for an update window, for example, monitoring peripheral inputs such as keystrokes on a keyboard, mouse movements, audio inputs, touch screen inputs, etc. When no such inputs are detected over a period of time, the update window is declared. Once an update window is found, the update program 20 terminates the security software 14 (currently running), performs the update to the security software 14, and then restarts the security software 14.

Figure 2:
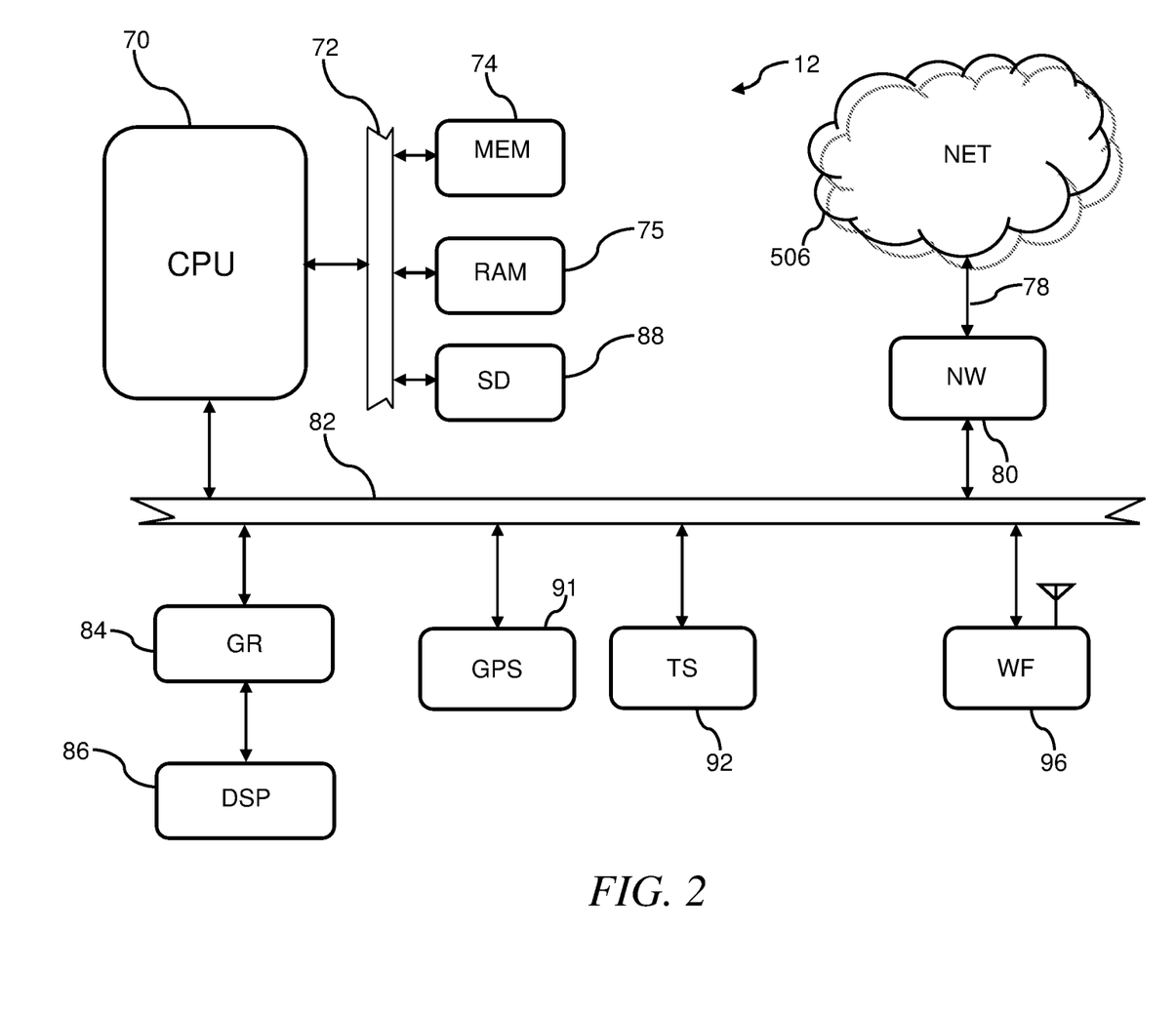
FIG. 2 illustrates a schematic view of a typical device, for example, a device system protected by the of the smart software update system.

Referring to FIG. 2, a schematic view of an exemplary protected device 12 is shown. The exemplary device 12 is a processor-based device that has applications or other software such as security software 16 that are periodically updated. The present invention is in no way limited to any particular device 12, as many other processor-based devices are equally anticipated including, but not limited to smart phones, cellular phones, portable digital assistants, routers, thermostats, fitness devices, etc.

The exemplary device 12 represents a typical device used by an end user or a shared device such as a server. This exemplary device 12 is shown in its simplest form. Different architectures are known that accomplish similar results in a similar fashion, and the present invention is not limited in any way to any particular system architecture or implementation. In this exemplary device 12, a processor 70 executes or runs programs in a random-access memory 75. The programs are generally stored within a persistent memory 74 and loaded into the random-access memory 75 when needed. In some protected devices 12, a removable storage slot 88 (e.g., compact flash, SD) offers removable persistent storage. The processor 70 is any processor, typically a processor designed for phones. The persistent memory 74 and random-access memory 75 are connected to the processor by, for example, a memory bus 72. The random-access memory 75 is any memory suitable for connection and operation with the selected processor 70, such as SRAM, DRAM, SDRAM, RDRAM, DDR, DDR-2, etc. The persistent memory 74 is any type, configuration, capacity of memory suitable for persistently storing data, for example, flash memory, read only memory, battery-backed memory, etc. In some exemplary protected devices 12, the persistent memory 74 is removable, in the form of a memory card of appropriate format such as SD (secure digital) cards, micro-SD cards, compact flash, etc. In some devices 12, the persistent memory 74 is a disk drive (not shown for brevity and clarity reasons) connected to the system bus 82.

Also connected to the processor 70 is a system bus 82 for connecting to peripheral subsystems such as a network interface 80, a graphics adapter 84 and a touch screen interface 92. The graphics adapter 84 receives commands from the processor 70 and controls what is depicted on the display 86. The touch screen interface 92 provides navigation and selection features.

In general, some portion of the persistent memory 74 and/or the removable storage 88 is used to store programs, executable code, phone numbers, contacts, and data, etc. In some embodiments, other data is stored in the persistent memory 74 such as audio files, video files, text messages, etc.

The peripherals are examples, and other peripherals are known in the industry such as Global Positioning Subsystems, speakers, microphones, USB interfaces, cameras, microphones, Bluetooth transceivers, Wi-Fi transceivers 96, touch screen interfaces 92, image sensors, temperature sensors, etc., the details of which are not shown for brevity and clarity reasons.

The network interface 80 connects the exemplary device 12 to the network 506 (e.g., the Internet, LAN, WAN) through any known or future protocol such as Ethernet, WI-FI, GSM, TDMA, LTE, etc., through a wired and/or wireless medium. There is no limitation on the type of connection used. The network interface 80 provides data and messaging connections between the exemplary device 12 and the server 500 through the network 506.

Figure 3:
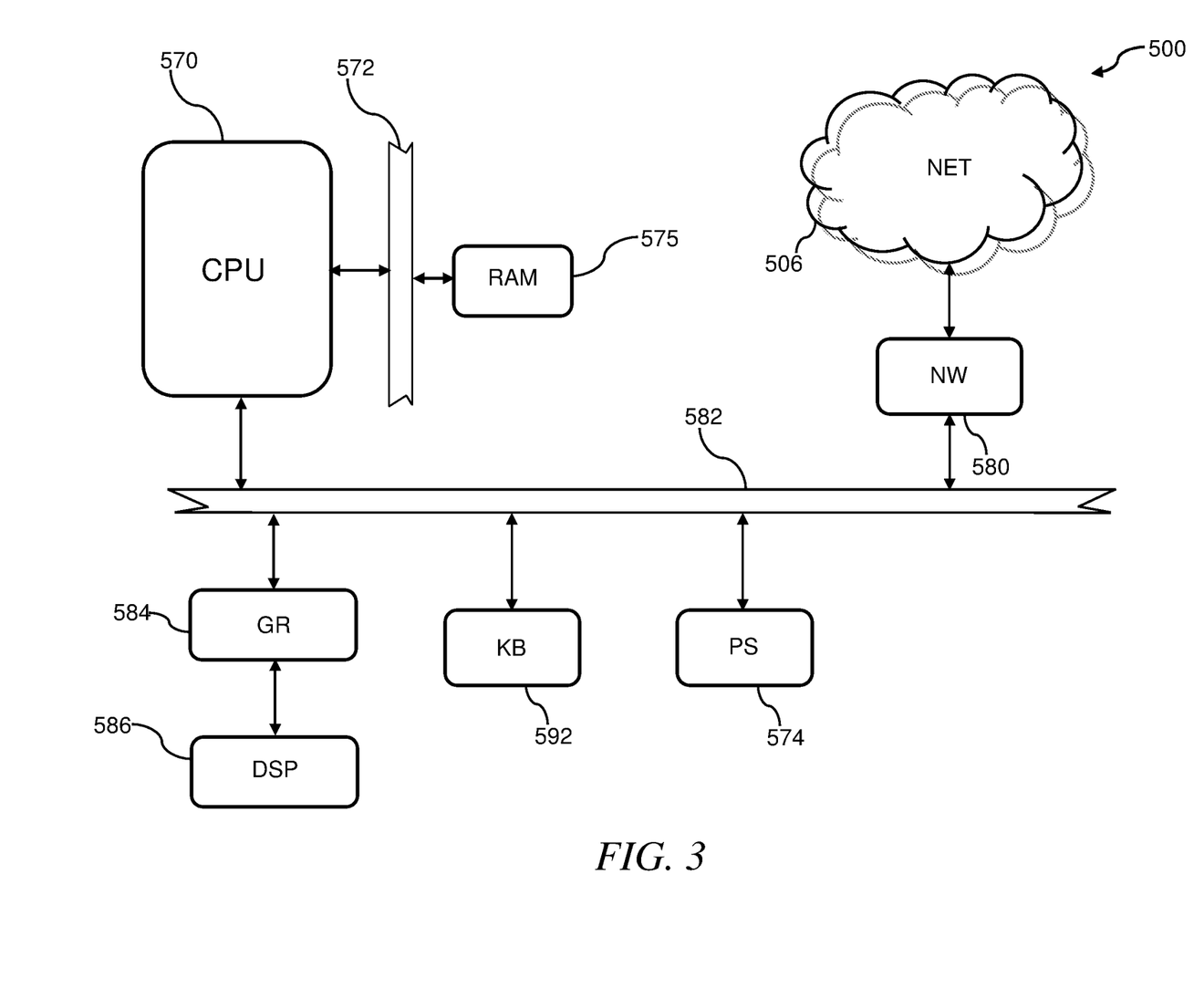
FIG. 3 illustrates a schematic view of a typical server computer system.

Referring to FIG. 3, a schematic view of a typical server 500 is shown. The exemplary server 500 represents a typical server computer system. Although the exemplary server 500 is shown as a stand-alone system, it is fully anticipated that the server 500 be part of a cloud-computing environment or include multiple computers. Different architectures are known that accomplish similar results in a similar fashion and the present invention is not limited in any way to any particular computer system architecture or implementation. In this exemplary computer system, a processor 570 executes or runs programs in a random-access memory 575. The programs are generally stored within a persistent memory 574 and loaded into the random-access memory 575 when needed. The processor 570 is any processor, typically a processor designed for computer systems with any number of core processing elements, etc. The random-access memory 575 is connected to the processor by, for example, a memory bus 572. The random-access memory 575 is any memory suitable for connection and operation with the processor 570, such as SRAM, DRAM, SDRAM, RDRAM, DDR, DDR-2, etc. The persistent memory 574 is any type, configuration, capacity of memory suitable for persistently storing data, for example, magnetic storage, flash memory, read only memory, battery-backed memory, magnetic memory, etc. The persistent memory 574 is typically interfaced to the processor 570 through a system bus 582, or any other interface as known in the industry.

Also shown connected to the processor 570 through the system bus 582 is a network interface 580 (e.g., for connecting to a network 506—e.g., the Internet, WAN, LAN), a graphics adapter 584 and a keyboard interface 592 (e.g., Universal Serial Bus—USB). The graphics adapter 584 receives information from the processor 570 and controls what is depicted on a display 586. The keyboard interface 592 provides navigation, data entry, and selection features.

In general, some portion of the persistent memory 574 is used to store programs, executable code, master data file 110M, and other data, etc.

The peripherals are examples and other peripherals are known in the industry such as pointing devices, touch-screen interfaces, speakers, microphones, USB interfaces, Bluetooth transceivers, Wi-Fi transceivers, image sensors, temperature sensors, etc., the details of which are not shown for brevity and clarity reasons.

Figure 4:
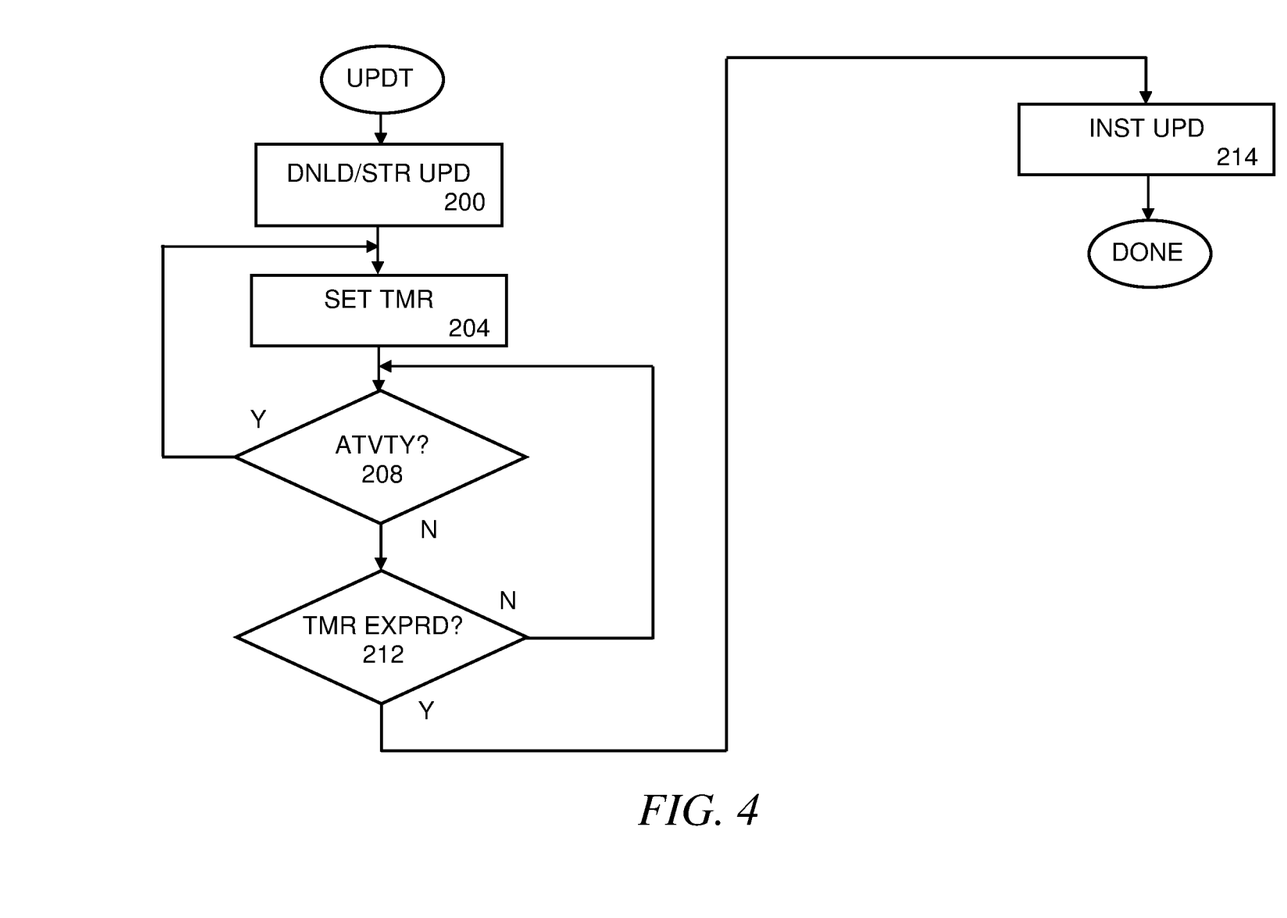
FIGS. 4, 5 and 6 illustrate exemplary program flows of the of the smart software update system running on a protected device.

Referring to FIG. 4, a process flow for the smart software update system that runs on the device 12 is shown. When an update to a program/application is required or requested, the smart software update system downloads 200 the updated application and stores the updated application in a temporary storage. For example, the update includes executable files, data files, images, etc.

Next, the smart software update system sets a timer 204 (e.g., a timer measuring how long the device 12 has operated without any detected activity) and starts a loop in which if there is a detected activity 208, the smart software update system resets the timer 204 and restarts the loop. If there is no detected activity 208, then the timer is checked to determine if the timer has expired 212, If the timer has not expired 212, the loop continues. If the timer has expired 212, then it is determined that the device 12 has been inactive or idle for the amount of time of the timer and, now that there is a update window, the update smart software update system installs 214 the updated application which includes terminating the application before installation and restarting the application after installation.

The above is an exemplary implementation using a time delay and it is equally anticipated to implement the same or similar functionality using interrupt algorithms or any way to monitor activity during a period of time.

The test for activity is anticipated to be any single activity, combination of activities, activities that exceed thresholds, and/or combination of activities that exceed thresholds. For example, a single activity is a user action using a peripheral of the device 12 such as an input from the touchscreen 92, a keystroke on a keyboard interfaced to the device 12, a mouse movement input from a mouse interfaced to the device 12, detection of movement by a camera interfaced to the device 12, or detection of voice input from a microphone interfaced to the device 12. As another example, a combination of activities is detection of movement by a camera interfaced to the device 12 and detection of voice input from a microphone interfaced to the device 12. As another example, activities that exceed thresholds are disk activity of a disk interfaced to the device 12 of greater than a threshold (e.g., greater than 2%), network activity of a network adapter interfaced to the device 12 of greater than a threshold (e.g., greater than 2%), sound detected by a microphone interfaced to the device 12 of greater than a threshold volume (e.g., greater than −20 dB). As another example, a combination of activities that exceed thresholds is sound detected by a microphone interfaced to the device 12 of greater than a threshold volume (e.g., greater than −20 dB) and an image captured by a camera interfaced to the device 12 having greater than a certain threshold of flesh-tone pixels (e.g., more than 10% of the pixels are flesh-tone). This combination implies that there is a person in front of the device 12 that is making a certain amount of noise. Note, flesh-tone pixels are pixels having a color value that is an expected flesh tone such a certain blacks, browns, pinks, blush colors as apposed to blues, greens, purples.

In some embodiments, while the smart software update system installs 214 the update, activity at the device 12 is monitored. For example, if the update is being installed and a keystroke or mouse movement is detected, it is determined that there is activity during when the smart software update system installs 214 the update. Although the install 214 must still run until the update is complete, this detection of activity (any activity as discussed above) is used to adjust any or all of the thresholds or timer settings. This provides for the smart software update system to adapt to the environment of the device 12 and the user of the device 12. For example, if the timer is set for five minutes and a keyboard input is not detected for 2 minutes, but after the smart software update system starts to install 214 the update, a keyboard input is detected, it is possible that the user of the device 12 is operating in a transactional mode where the user waits for an incoming phone call, answers, exchanges pleasantries, then types on the keyboard, for example to find the caller's account. In such, the smart software update system will adjust the timer to a higher value (e.g., 5 minutes) or increase the timer each time such an exception occurs. Now, say the timer is set at 5 minutes and the user of the device 12 goes on break. Now the 5-minute timer will lapse and the smart software update system will install 214 the update.

Figure 5:
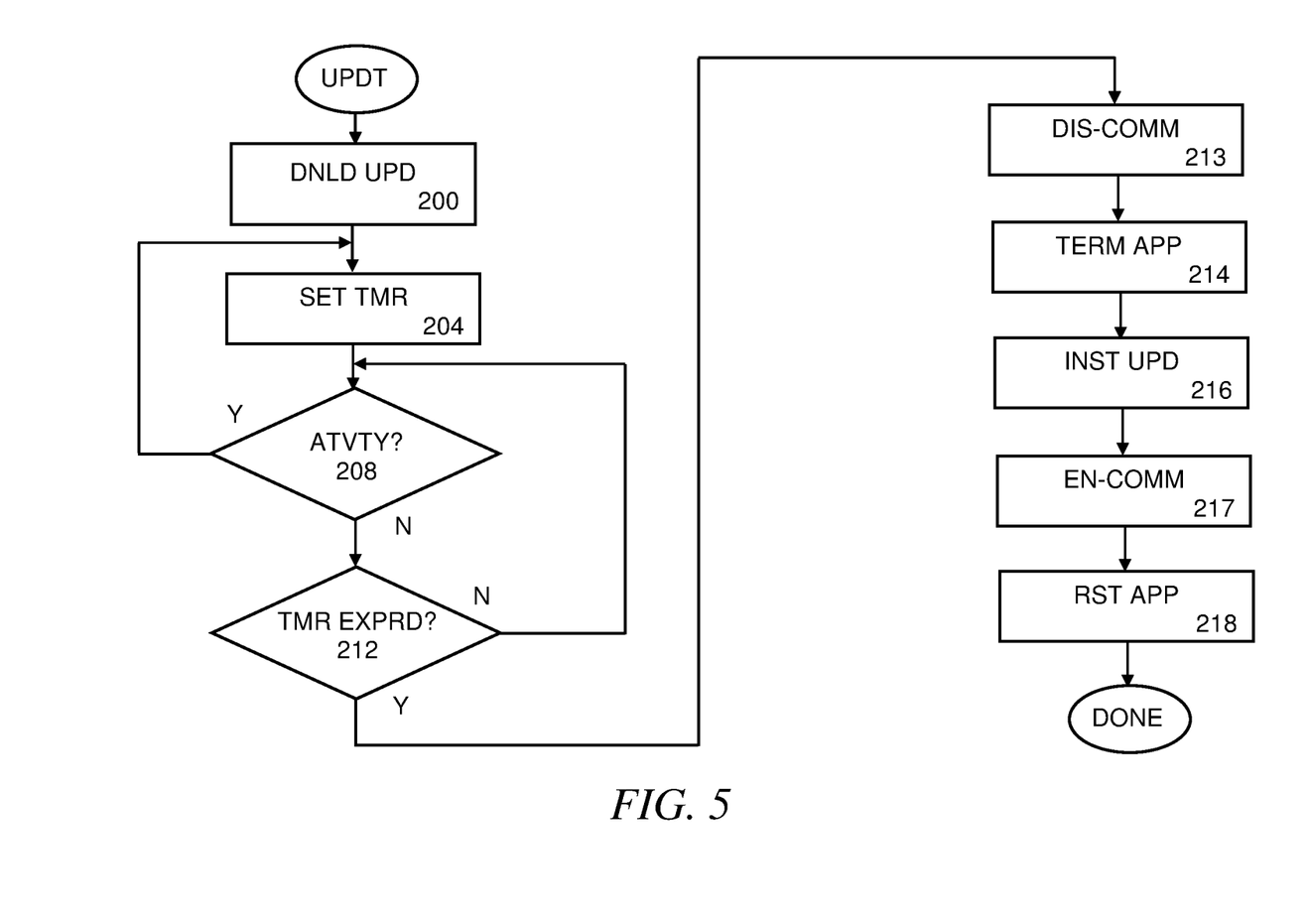

In FIG. 5, a process flow for the smart software update system that runs on the device 12 is shown. When an update to a program is required or requested, the smart software update system downloads 200 the update and stores the update in a temporary storage. For example, the update includes executable files, data files, images, etc.

Next, the smart software update system sets a timer 204 (e.g., a timer measuring how long the device 12 has operated without any detected activity) and starts a loop in which if there is a detected activity 208, the smart software update system resets the timer 204 and restarts the loop. If there is no detected activity 208, then the timer is checked to determine if the timer has expired 212, If the timer has not expired 212, the loop continues. If the timer has expired 212, then it is determined that the device 12 has been inactive or idle for the amount of time of the timer and, now that there is an update window, the update smart software update system first disconnects communications 213 (e.g., disables a network adapter), terminates 214 the application (assuming the application is running on the processor of the device 12), installs 216 the update, then enabled communications 217, and restarts 218 the application (also assuming the application was running before the update). By disabling communications 213, the smart software update system helps prevent intrusion by malware when certain key programs/applications are updated, for example, when the security software 16 is updated.

Figure 6:
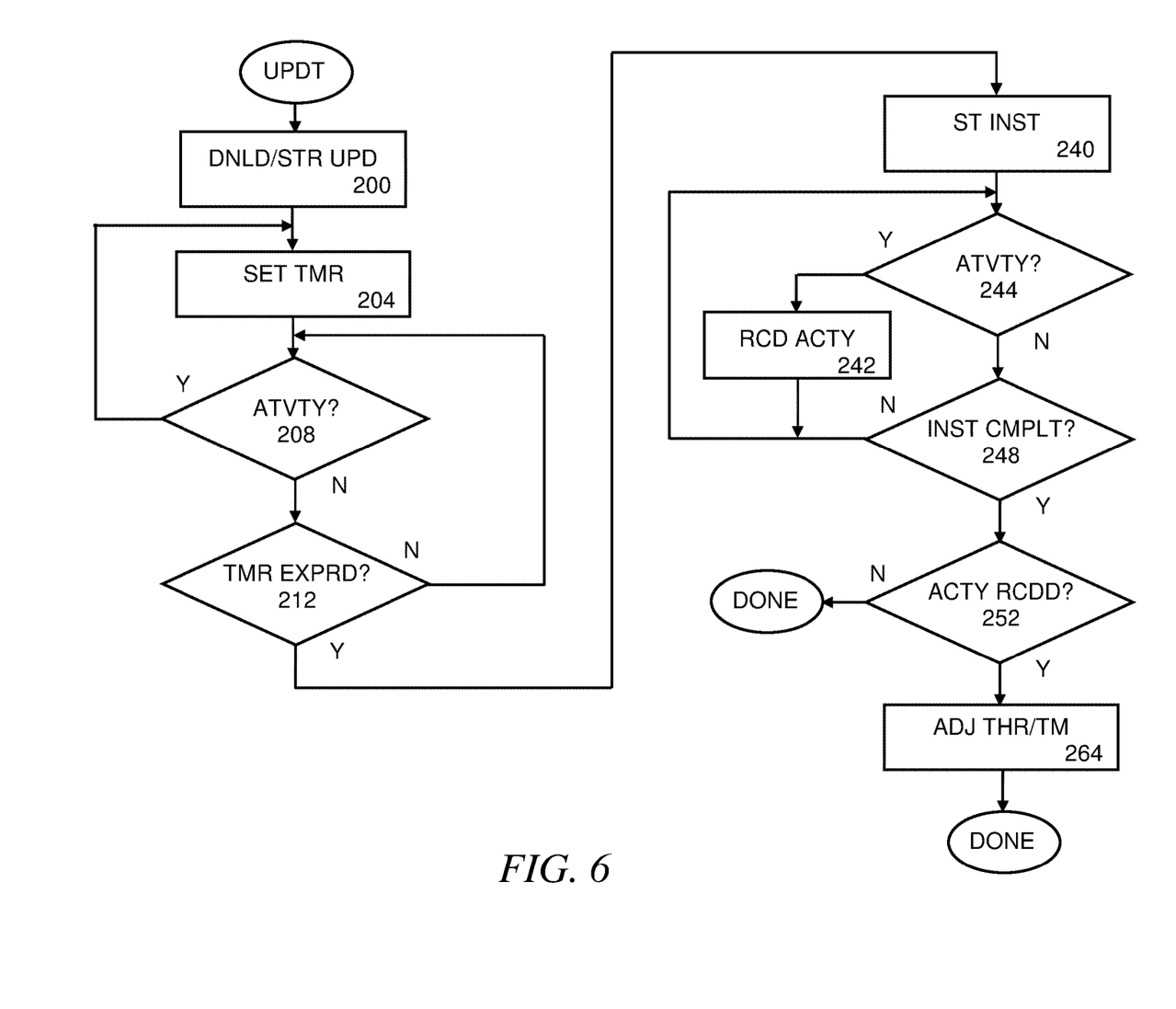

In FIG. 6, a process flow for the smart software update system that runs on the device 12 is shown. When an update to a program is required or requested, the smart software update system downloads 200 the update and stores the update in a temporary storage. For example, the update includes executable files, data files, images, etc.

Next, the smart software update system sets a timer 204 (e.g., a timer measuring how long the device 12 has operated without any detected activity) and starts a loop in which if there is a detected activity 208, the smart software update system resets the timer 204 and restarts the loop. If there is no detected activity 208, then the timer is checked to determine if the timer has expired 212, If the timer has not expired 212, the loop continues. If the timer has expired 212, then it is determined that the device 12 has been inactive or idle for the amount of time of the timer and, now that there is an update window, the update smart software update system starts 240 updating the software. Until the software update is complete 248, the smart software update system checks for activity 244 and if there is activity 244 (e.g., activity during the installation) the activity is recorded 242. After the installation is complete 248, the smart software update system tests 252 to determine if any activity was recorded 242 and if the test 252 shows that an activity was recorded, the smart software update system adjusts 264 one or more thresholds or the time of which the timer is set.

Equivalent elements can be substituted for the ones set forth above such that they perform in substantially the same manner in substantially the same way for achieving substantially the same result.

It is believed that the system and method as described and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A system for smart software updates, the system comprising:
    a device, the device having a processor, a memory that is tangible, an application located in the memory and the application runs on the processor, and an operating system software runs on the processor;
    smart update software runs on the processor;
    after receiving a request to update the application, the smart update software downloads update information for the application and stores the update information in the memory;
    next, the smart update software monitors inputs/outputs of the device for absence of activity for a period of time to determine an update window and after the smart update software determines the update window, the smart update software installs the update information for the application; and
    wherein before the smart update software installs the update information, the smart update software terminates the application that is running on the processor and after the smart update software installs the update information, the smart update software restarts the application to run on the processor.

2. The system of claim 1, wherein the device further comprises a network interface adapter and before the smart update software installs the update information, the smart update software disables the network interface adapter; and after the smart update software installs the update information, the smart update software enables the network interface adapter.

3. The system of claim 1, wherein the smart update software monitors human input device inputs on the device for absence of activity for the period of time to determine the update window which is when there is an absence of human input device inputs for the period of time.

4. The system of claim 1, wherein the smart update software monitors system activity on the device for activity that remains lower than a pre-determined threshold for the period of time to determine the update window which is when the system activity remains lower than the pre-determined threshold for the period of time.

5. The system of claim 1, wherein the system further comprises an audio input device interfaced to the processor and the smart update software monitors system activity on the audio input device for a noise level that remains lower than a pre-determined noise level for the period of time to determine the update window which is when the noise level detected by the audio input device is lower than the pre-determined noise level for the period of time.

6. The system of claim 1, wherein the smart update software determines the update window when a target of the update deals with a specific resource and the specific resource is not in use.

7. A method for updating an application that is installed on a device that has a processor, storage, and an operating system software running on the processor, the method comprising:
   receiving a request to update the application;
   downloading update information for the application and storing the update information in the storage;
   next, determining an update window by monitoring inputs/outputs of the device for absence of activity over a period of time and after determining the update window,
   installing the update information for the application; and
   wherein before installing the update information, terminating the application and after installing the update information, restarting the application.

8. The method of claim 7, wherein the device further comprises a network interface adapter interfaced to the processor and before installing the update information, disabling the network interface adapter and after installing the update information, enabling the network interface adapter.

9. The method of claim 7, wherein the step of determining the update window includes determining when there is an absence of human input device inputs for a period of time.

10. The method of claim 7, wherein the step of determining the update window includes determining when there a system activity remains lower than a pre-determined threshold for a period of time.

11. The method of claim 7, wherein the device further comprises an audio input device interfaced to the processor and the step of determining the update window includes determining when a noise level detected by the audio input device is lower than a pre-determined noise level for a period of time.

12. The method of claim 7, wherein the step of determining the update window includes determining when a target of the update deals with a specific resource and determining when the specific resource is not in use.

13. A system for smart software updates, the system comprising:
   a device, the device having a processor, storage, an application located in the storage and running on the processor, at least one human input device, and an operating system software that runs on the processor;
   smart update software runs on the processor;
   after receiving a request to update the application, the smart update software downloads update information for the application and stores the update information in the storage;
   next, the smart update software monitors the device and waits until there is an absence of inputs from the at least one human input device for a pre-determined period of time and after the smart update software finds an absence of inputs from the at least one human input device for the pre-determined period of time, the smart update software installs the update information for the application; and
   wherein before the smart update software installs the update information, the smart update software terminates the application and after the smart update software installs the update information, the smart update software restarts the application.

14. The system of claim 13, wherein the device further comprises a network interface adapter and before the smart update software installs the update information, the smart update software disables the network interface adapter; and after the smart update software installs the update information, the smart update software enables the network interface adapter.

15. The system of claim 13, wherein the smart update software monitors inputs from the at least one human input device while the smart update software installs the update information and if an input from the at least one human input device is detected while the smart update software installs the update information, the smart update software increases the pre-determined period of time.

16. The system of claim 13, wherein the at least one human input device is any one or more of a keyboard, mouse, touchscreen, pointing stick, and a gesture capture device.

17. The system of claim 13, wherein the at least one human input device includes an audio device for accepting human speech.

* * * * *